United States Patent
Kulkarni et al.

(10) Patent No.: US 10,642,721 B2
(45) Date of Patent: May 5, 2020

(54) GENERATION OF AUTOMATED TESTING SCRIPTS BY CONVERTING MANUAL TEST CASES

(71) Applicant: Accenture Global Solutions Limited, Dublin (IE)

(72) Inventors: Girish Kulkarni, Bangalore (IN); Sivasankar Ramalingam, Guduvanchery (IN); Chinmaya Ranjan Jena, Bangalore (IN)

(73) Assignee: Accenture Global Solutions Limited, Dublin (IE)

( * ) Notice: Subject to any disclaimer, the term of this patent is extended or adjusted under 35 U.S.C. 154(b) by 306 days.

(21) Appl. No.: 15/867,293

(22) Filed: Jan. 10, 2018

(65) Prior Publication Data
US 2019/0213116 A1    Jul. 11, 2019

(51) Int. Cl.
*G06F 11/36* (2006.01)
*G06N 5/02* (2006.01)

(52) U.S. Cl.
CPC ...... *G06F 11/3684* (2013.01); *G06F 11/3664* (2013.01); *G06F 11/3688* (2013.01); *G06N 5/02* (2013.01)

(58) Field of Classification Search
CPC ............. G06F 11/3664; G06F 11/3684; G06F 11/3688
See application file for complete search history.

(56) References Cited

U.S. PATENT DOCUMENTS 9,021,440 B1 *  4/2015  Chandrasekaran ......................... G06F 11/3684 717/124
9,032,360 B1    5/2015  Cohen et al.
(Continued)

FOREIGN PATENT DOCUMENTS

WO    WO 2011/041672    4/2011

OTHER PUBLICATIONS

Zhu Xiaochun et al., "A Test Automation Solution on GUI Functional Test", Jul. 2008, IEEE (Year: 2008).*
(Continued)

*Primary Examiner* — Chat C Do
*Assistant Examiner* — Douglas M Slachta
(74) *Attorney, Agent, or Firm* — Fish & Richardson P.C (57) ABSTRACT

Methods, systems, and apparatus, including computer programs encoded on a computer storage medium, for an automated testing script generation system are disclosed. In one aspect, a method includes the actions of receiving a context file, a test scenario, and a selected automation tool selected through a user interface, the context file including an object map comprising objects that correlate to respective components of a display page, the test scenario describing a test case for the application involving an intended interaction with a component on the display page, correlating the intended interaction with the component with the corresponding object in the object map, processing the intended interaction and the corresponding object through an Artificial Intelligence (AI) model, determining a script template
(Continued)

based, applying the script template to generate an automated testing script for the selected automating tool, and executing the automated testing script to test the function of the display page.

18 Claims, 6 Drawing Sheets

(56) References Cited

U.S. PATENT DOCUMENTS

| | | | |
|---|---|---|---|
| 9,047,414 B1* | 6/2015 | Matyjek | G06F 11/3688 |
| 9,495,642 B1 | 11/2016 | Smith | |
| 10,073,763 B1 | 9/2018 | Raman et al. | |
| 10,114,738 B2* | 10/2018 | Dsouza | G06F 17/2785 |
| 10,318,882 B2* | 6/2019 | Brueckner | H04L 67/10 |
| 10,430,323 B2 | 10/2019 | Raman et al. | |
| 2005/0102596 A1 | 5/2005 | Hekmatpour | |
| 2006/0156287 A1* | 7/2006 | Vikram | G06F 11/3684 717/124 |
| 2007/0156379 A1 | 7/2007 | Kulkarni | |
| 2009/0013307 A1* | 1/2009 | Raghavan | G06F 30/20 717/106 |
| 2011/0246881 A1* | 10/2011 | Kushman | G06F 9/453 715/708 |
| 2012/0197595 A1 | 8/2012 | Gouthannan et al. | |
| 2012/0266023 A1 | 10/2012 | Brown | |
| 2013/0074051 A1 | 3/2013 | Freeman et al. | |
| 2013/0097586 A1* | 4/2013 | Chandra | G06F 11/3684 717/124 |
| 2014/0380280 A1 | 12/2014 | Millwood | |
| 2015/0081614 A1 | 3/2015 | Bechet et al. | |
| 2015/0082277 A1 | 3/2015 | Champlin-Scharff et al. | |
| 2015/0227452 A1* | 8/2015 | Raghavan | G06F 11/3684 717/124 |
| 2015/0254165 A1 | 9/2015 | Baril et al. | |
| 2015/0378873 A1 | 12/2015 | Prasad et al. | |
| 2015/0379072 A1* | 12/2015 | Dirac | G06N 20/00 707/693 |
| 2015/0379429 A1* | 12/2015 | Lee | G06N 20/00 706/11 |
| 2016/0011960 A1 | 1/2016 | Krishna et al. | |
| 2016/0011963 A1 | 1/2016 | Krishna et al. | |
| 2016/0077956 A1 | 3/2016 | Bhattacharya et al. | |
| 2016/0217062 A1* | 7/2016 | Singi | G06F 11/3684 |
| 2017/0004064 A1* | 1/2017 | Rufai | G06F 11/3612 |
| 2017/0046245 A1 | 2/2017 | Liu et al. | |
| 2017/0212829 A1 | 7/2017 | Bales | |
| 2017/0344467 A1 | 11/2017 | Yadav et al. | |
| 2018/0011780 A1* | 1/2018 | Aggarwal | G06F 11/3672 |
| 2018/0069967 A1 | 3/2018 | Mandry | |
| 2018/0373620 A1* | 12/2018 | Thomson | G06F 11/3684 |
| 2019/0065357 A1 | 2/2019 | Brafman | |
| 2019/0196950 A1 | 5/2019 | Ranganathan et al. | |
| 2019/0196949 A1* | 6/2019 | Venkataraman | G06F 11/3696 |
| 2019/0370160 A1 | 12/2019 | Raman et al. | |

OTHER PUBLICATIONS

Virender Singh, "What is Gherkin and How to write Gherkin Test in Cucumber", Dec. 31, 2014, (Year: 2014).*
European Search Report in European Appln. No. EP18208043, dated May 23, 2019, 7 pages.
European Search Report in European Appln. No. EP 19150223, dated Jun. 6, 2019, 9 pages.
Zhu et al. "A test automation solution on GUI functional test" IEEE Xplore, Jul. 13, 2008, pp. 1413-1418.
Chao Chen et. al, "Usage-pattern Based Statistical Web Testing and Reliability Measurement," ScienceDirect Procedia Computer, Science 21 (2013), 140-147.
EP Search Report in European Appln. No. EP 18208043.2, dated May 23, 2019, 7 pages.
EP Extended European Search Report in European Appln. No. EP 19150223.6, dated Jun. 6, 2019, 9 pages.
Upadhyah, "Prioritizing Test Suites using Clustering Approach in Software Testing", International Journal of Soft Computing and Engineering, 2(4):222-226, Sep. 2012.

* cited by examiner

@ApplyForACreditCard

Feature: Apply for a Credit card on [Card Website]
Scenario: Applying for a [specific card name]
Given that I launch the [Card's] online portal in a browser
And search for a credit card as '[card nickname]'
And select the option '[specific card name]'
When I click on Apply now
Then I should be able to furnish all the required customer details
And I should be able to successfully submit my application

GENERATION OF AUTOMATED TESTING SCRIPTS BY CONVERTING MANUAL TEST CASES

TECHNICAL FIELD

This application generally relates to generating automated testing scripts.

BACKGROUND

Software applications are designed to accommodate a multitude of transactions, where each transaction often requires the performance of a significant number of functions. A regression test suite is a set of test cases, often written in the form of a script, designed to ensure that each of these functions remain accurate and correct following modification of the underlying programing code. Execution of these suites helps to ensure that defects have not been introduced or uncovered in unchanged areas of the codebase as a result of the modification. Moreover, each level of testing (e.g., unit testing, system testing, and acceptance testing) may have its own regression test suite. Today, providers of these applications and/or their corresponding services are faced with the problem of having large regression test suites that are executed manually and the need to automate these test suites to function within any one of a number of industry standard automation tools. Once automated, these test cases can be executed repeatedly and frequently, which adds to the amount of testing coverage for the respective application. However, to automate these manual test cases, a tester must record the test scenario or create a script specific to a designated automation tool, which is both time consuming and effort intensive.

SUMMARY

Implementations of the present disclosure are generally directed to an automated testing script generation system. More specifically, implementations are directed to a system that generates automated testing scripts for a selected automation tool based on a received test scenario and a selected context file. The system correlates the information from the test scenario and context file and employs a trained Artificial Intelligence (AI) model to apply a template to the correlated data to generate the automated testing script.

In a general implementation, a computer-implemented method executed by one or more processors, the method including: receiving a context file, a test scenario, and a selected automation tool selected through a user interface, the context file including an object map comprising objects that correlate to respective components of a display page for an application, the test scenario describing a test case for the application involving an intended interaction with at least one of the components on the display page; correlating the intended interaction with the at least one component with the corresponding object in the object map; processing the intended interaction and the corresponding object through an Artificial Intelligence (AI) model, the AI model trained using training data comprising a plurality of processes and respective process steps supported by the components of the display page; determining a script template based on the processing and the selected automation tool; applying, based on the processing, the script template to the intended interaction and the correlated object to generate an automated testing script for the selected automating tool; and executing the automated testing script to test one or more functions of the display page supporting the test scenario.

In another general implementation, One or more non-transitory computer-readable storage media coupled to one or more processors and having instructions stored thereon which, when executed by the one or more processors, cause the one or more processors to perform operation including: receiving a context file, a test scenario, and a selected automation tool selected through a user interface, the context file including an object map comprising objects that correlate to respective components of a display page for an application, the test scenario describing a test case for the application involving an intended interaction with at least one of the components on the display page; correlating the intended interaction with the at least one component with the corresponding object in the object map; processing the intended interaction and the corresponding object through an Artificial Intelligence (AI) model, the AI model trained using training data comprising a plurality of processes and respective process steps supported by the components of the display page; determining a script template based on the processing and the selected automation tool; applying, based on the processing, the script template to the intended interaction and the correlated object to generate an automated testing script for the selected automating tool; and executing the automated testing script to test one or more functions of the display page supporting the test scenario.

In yet another general implementation, a system that includes: one or more processors; and a computer-readable storage device coupled to the one or more processors and having instructions stored thereon which, when executed by the one or more processors, cause the one or more processors to perform operations including: receiving a context file, a test scenario, and a selected automation tool selected through a user interface, the context file including an object map comprising objects that correlate to respective components of a display page for an application, the test scenario describing a test case for the application involving an intended interaction with at least one of the components on the display page; correlating the intended interaction with the at least one component with the corresponding object in the object map; processing the intended interaction and the corresponding object through an Artificial Intelligence (AI) model, the AI model trained using training data comprising a plurality of processes and respective process steps supported by the components of the display page; determining a script template based on the processing and the selected automation tool; applying, based on the processing, the script template to the intended interaction and the correlated object to generate an automated testing script for the selected automating tool; and executing the automated testing script to test one or more functions of the display page supporting the test scenario.

In an aspect combinable with any of the general implementations, the test scenario includes scenario data used for the intended interaction, and wherein the automated testing script is generated by applying the script template to the scenario data.

In another aspect combinable with any of the previous aspects, further including parsing the test scenario through natural language processing techniques to determine the intended interaction.

Another aspect combinable with any of the previous aspects, the test scenario is included in a feature file written in Gherkin.

In another aspect combinable with any of the previous aspects, the context file is generated by: parsing the display page to identify the components, and logically mapping the components to the respective objects.

In another aspect combinable with any of the previous aspects, the automated testing script is generated with default values for the intended interaction.

In another aspect combinable with any of the previous aspects, the automated testing script is generated to include placeholder data, wherein the AI model is retrained to replace the placeholder data with the appropriate scripting code, and wherein the placeholder data is replaced with the appropriate scripting code by processing the automated testing script through the AI model.

In another aspect combinable with any of the previous aspects, the selected automation tool is one of Unified Functional Testing (UFT), Tricentis Tosca™, Worksoft Certify™, or Selenium™.

In another aspect combinable with any of the previous aspects, the AI model is trained through machine learning techniques by applying data regarding the processes to an algorithm.

It is appreciated that methods in accordance with the present disclosure can include any combination of the aspects and features described herein. That is, methods in accordance with the present disclosure are not limited to the combinations of aspects and features specifically described herein, but also may include any combination of the aspects and features provided.

The details of one or more implementations of the present disclosure are set forth in the accompanying drawings and the description below. Other features and advantages of the present disclosure will be apparent from the description and drawings, and from the claims.

DETAILED DESCRIPTION

Often, test cases (e.g., test scenarios) are described in a free flow language form, without any well-defined format, and in the natural or agreed upon language of the parties, such as English. Thus, it is difficult for a computer program to translate this information into an automated testing script. Moreover, development projects are increasingly using test scenarios written in a behavior-driven development (BDD) style using a formatted language, such as Gherkin. The formatted language allows for instructions to be written as plain text in a traditional written language, such as English or one over 60 other languages, with some additional structure. These formatted languages are designed to be easy to learn by non-programmers, yet structured enough to allow concise description of examples to illustrate business rules in most real-world domains. In this way, the formatted languages can be used to capture requirements and define the test scenarios.

By way of example, a test scenario or list of scenarios may be included in what is called a feature file, where a formatted language, such as Gherkin, is used to write the scenarios in a human readable way. Such a feature file may be used in the generation of an automated testing script for an automation tool. Example automation tools include Unified Functional Testing (UFT), Tricentis Tosca™, Worksoft Certify™, and Selenium™. The testing automation tool provides a framework that can be used to provide support software structures, such as step definitions, for each of the test scenarios. Step definitions act as skeleton placeholders where automation code blocks may be implemented. For example, each step in a given scenario may map to a step definition. The automation code block is implemented for each step definition and executed when the scenario is run by the testing framework. The automation code block may be in written in a variety of programming language, such as Ruby, C++, Java, Scala, Python, and so forth, selected based on system requirements. Once generated, the step definitions and respective code blocks, may be referred to as an automated testing script. The testing automation tool provides an execution environment for these generated scripts, which may be run for acceptance and/or regression testing.

The automated testing scripts may be implemented manually by a developer or generated automatically. One of the difficulties with automatic code generation of an automated testing script from a test scenario is that the test scenario may be written in many different ways because of the flexible nature of the formatted language (e.g., Gherkin). For example, each tester may describe the functionality or function of a test in his or her own way. For instance, "click on the submit button," "push the submit button," or "hit the submit button," all of which mean the same thing. Another issue is that the code blocks in an automated testing script may be repetitive, hence, the automation code may become bloated. Additionally, the free form English (or any other language), which may be used in the bulk of the file, lacks structure. For example, "Login to the application" and "Enter the user name, enter the password, and click sign in button" both denote the same function; one is a single sentence, but the other is three sentences. However, the same automation code block (script) should be generated in each of these examples.

In view of the foregoing, implementations of the present disclosure are generally directed to the creation of automated testing scripts based on a test scenario written free form in a particular language, such as English, or in a formatted language, such a Gherkin. The system parses a provided test scenario base on natural language processing techniques to determine the scenario's intent with any relevant data. For example, to login to a given application or program, such as a web application, with a user name and password or to complete a particular form in the web application with a certain set of information. The system correlates the intent with an object(s) on a selected page or screen of the web application. Once the intent and objects are correlated, the system selects a template(s) corresponding to a designated automation tool to generate the automated testing script for the provided scenario. Once the test scenario has been translated to an automated testing script, the test scenarios can be tested frequently and used in a variety of testing processes through the use of the respective automated testing script. Additionally, the automated testing script may be more precise than the manual versions and may also be used in the generation of reports regarding respective application and/or the results of the testing.

Figure 1:
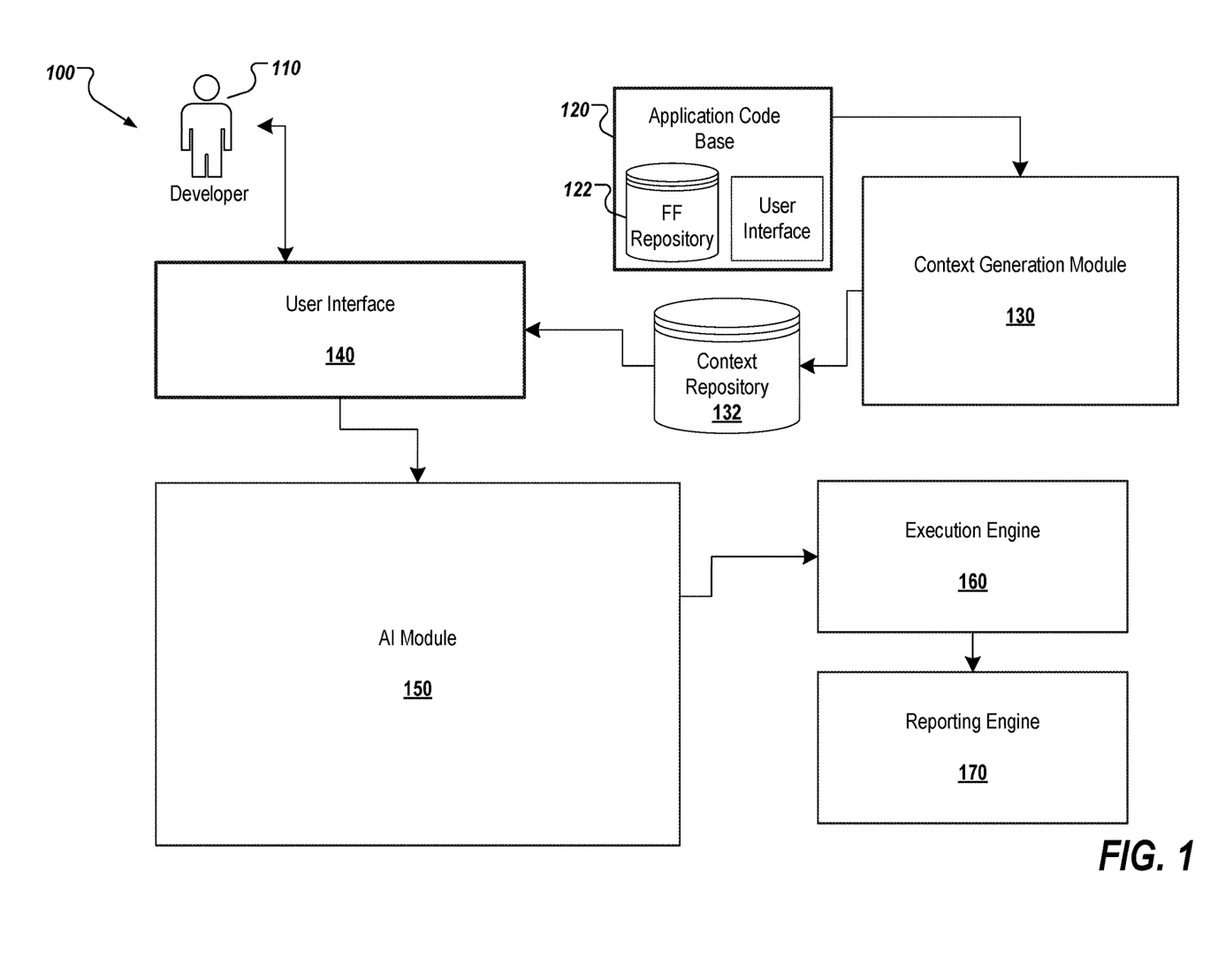
FIG. 1 depicts an example automated testing script generation system for generating automated testing scripts.

FIG. 1 depicts an example automated testing script generation system 100 for generating automated testing scripts. The example system 100 includes one or more developers 110, an application codebase 120, a feature file repository 122, a context generation module 130, a context repository 132, a user interface (UI) 140, an AI module 150, an execution engine 160, and a reporting engine 170. In the depicted example, the example automated testing script generation system 100 may be deployed to any special purpose computer system. The example system may be provided using one or more computing device(s) of any suitable number and type of computing device. Configuration of such computing devices include shared, virtual, managed/dedicated, cluster/grid, cloud based resources, and/or any combination thereof. The system 100 provides accesses to the developers 110 through the UI 140, which may be accessed over a network (not shown). In the depicted system 100, a developer 110 may analyze requirements for an application or system and then design, develop, and test software by applying the theories and principles of computer science and mathematical analysis.

The context generation module 130 is employed within the automated testing script generation system 100 to generate context files for each page or screen within a UI of an application codebase, such as the application codebase 120. The application codebase 120 represents any application or program that includes a UI, such as a web-based application or enterprise tool. Each UI accepts input and provides output via the various screens and/or pages of the respective UI. For example, web pages may be generated on a server or virtual server and transmitted via a network. The web pages may be received by a user device and viewed by, for example, a web browser program.

For a given UI, the context generation module 130 parses and builds a context framework based on the context for each page or screen. The context generation module 130 uses this framework as a sort of key to logically map the various functions on each page to respective objects that perform a prescribed action. The objects are grouped into an object map. A context file for each page is generated. The context file contains the determined object map for a respective page. By deriving this object context and storing the generated object maps at a page level, the automated testing script generation system 100 may more quickly access relevant information by narrowing down searches through the use of logical names for the objects. The context files are indexed in the context repository 132 according to, for example, a page identifier and an application identifier. Context repository 132 may be a relational database, such as Oracle or DB2, implemented on an enterprise database server or virtual server.

The UI 140 provides access for a user, such as the developer 110, to the automated testing script generation system 100, and more specifically, to the functionality provided by AI module 150. The UI 140 includes a series of screens, which may be received and viewed on a user device using, for example, a web browser program. Pages may be generated on a server or virtual server and transmitted via a network. The UI 140 allows a user to provide testing scenarios (e.g., test cases) to the AI module 150. In some implementations, the testing scenarios are included in a feature file that is written with Gherkin. A feature file may be selected from a feature file repository, such as the feature file repository 122. The feature file repository 122 may be a relational database, such as Oracle or DB2, implemented on an enterprise database server or virtual server. In some implementations, the feature files may be stored locally on the user's device or at some other location accessible over a network. The user selects a context file(s) from the context repository 132 to set the appropriate context (e.g., the page(s) and application) relevant to the test scenario. Additionally, the user may designate the automation tool, for which the automated testing script(s) should be generated. The UI 140 is discussed in more detail in the description of FIG. 4.

The AI module 150, generates an automated testing script(s) from a provided test scenario and context file. The AI module 150 extracts the intended interaction (intent) and relevant testing data from each test scenario through the employment of natural language processing (NLP) techniques. The intent is correlated to the appropriate test object(s) in the provided context file. For example, if the test scenario recites "Click on the Submit button," the AI module 150 parses the natural language and derives the context as "submit button," which it then maps to the submit button object within the object map of the submitted context file. A template for the selected automation tool is applied to the extracted intent and data along with the correlated object(s) to generate the resulting automated testing script. The AI module 150 is described in more detail in the description of FIG. 2.

The automated testing scripts can be pushed to the execution engine 160. The Execution engine 160 includes an auto-script server that runs the automation tools/platforms, such as Unified Functional Testing (UFT), Tricentis Tosca™, Worksoft Certify™, or Selenium™, employed within the automated testing script generation system 100. Such automation tools are used to provide stakeholders with information about the quality of the software product or service being tested, such as the application codebase 120. The execution engine 160 may be deployed on a server or virtual server.

The reporting engine 170 provides analytics and access to the reporting features to developer 110. The execution engine 160 may persist results from the execution of the generated automated testing scripts in a reporting database. The reporting engine 170 generates reports from the information stored in the reporting database, which can be reviewed by developer 110. These reports provide details on the performance of the system during the execution of the automated testing scripts and may include processing time, response time, and any warning messages displayed. Statistical reports may also be generated that summarize the health of the system as well as the any significant data points selected.

Figure 2:
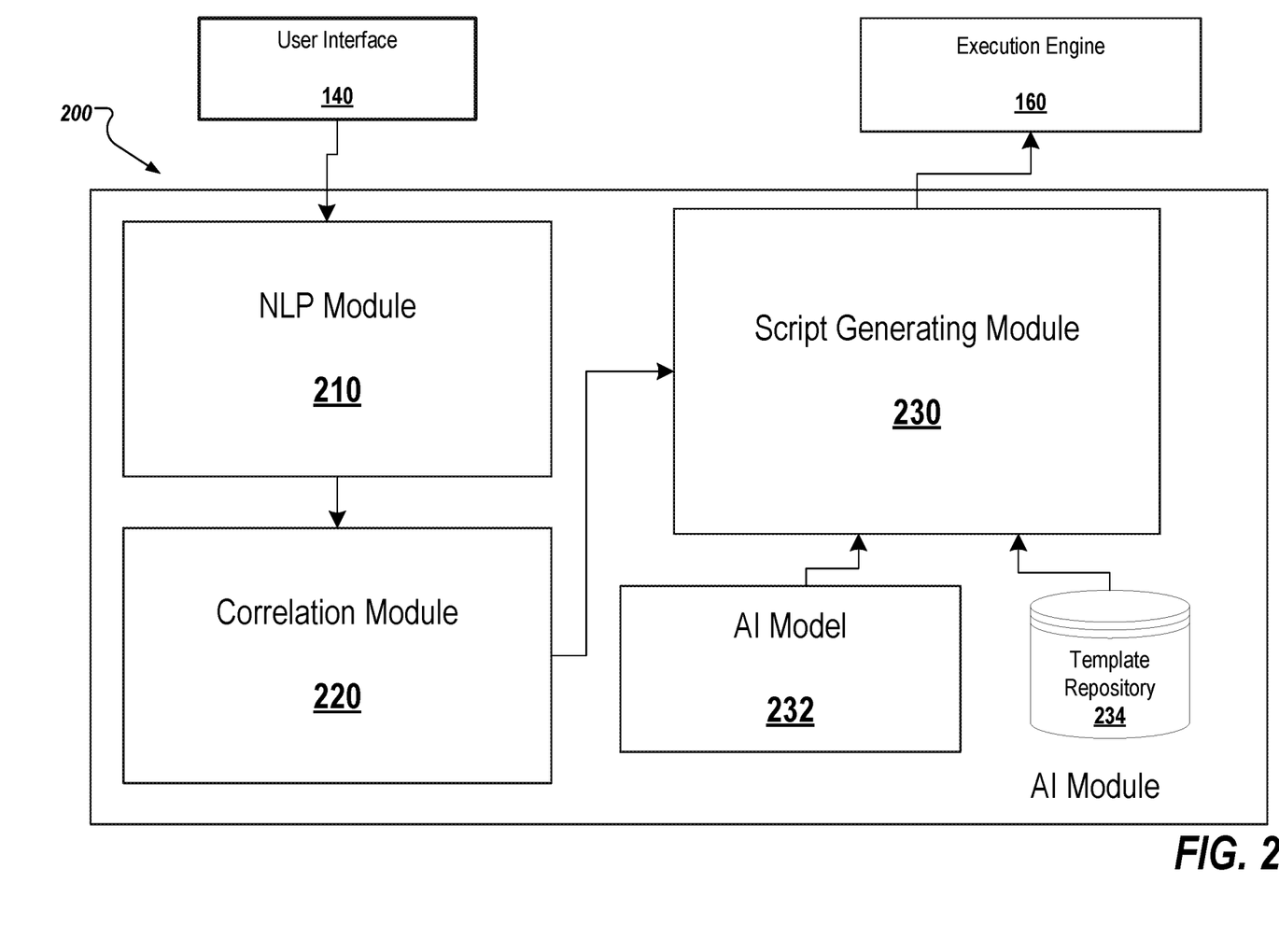
FIG. 2 depicts an example AI module for generating automated testing scripts.

FIG. 2 depicts an example AI module 200 for generating automated testing scripts. The AI module 200 is substantially similar to the AI module 150 of FIG. 1. The AI module 200 includes an NLP module 210, a correlation module 220, a script generating module 230, an AI model 232, and a template repository 234. As described above with regard to FIG. 1, the AI module 200 generates an automated testing script to run in a particular tool based on the determined intent of the test scenario, and the correlated test objects from the context file.

In the depicted example, the AI module 200 receives a test scenario and a context file from, for example, a UI, such as the UI 140 from FIG. 1. The NLP module 210 receives the input and parses the test scenario. NLP can be described as the ability of a computer program or software to understand human speech as it is spoken or written. NLP makes it possible for an AI program, such as the NLP module 210, to receive conversational or text input by breaking the respective syntax down to determine the input's meaning and/or determine an appropriate action. The NLP module 210 may employ an NLP application program interface (API), such as Apache OpenNLP™.

As an example, the NLP module 210 reads a line or set of lines from the received test scenario, which may be contained in a feature file. The NLP 210 module determines the various objects of the sentence(s), which are used to provide a context for the instructions in the test scenario. Based on this information, the NLP module 210 determines the intent of the scenario for each of the identified objects. For example, the scenario might read "to login, to enter a username, to enter a password, to click on submit, enter navigation." The NLP module 210 extracts the various intents for this scenario (e.g., "click," "login," and "enter"). Once the intent has been identified, it may be correlated to the object(s) in the context file by the correlation module 220 based on the AI model 230. Custom actions can also be trained into the NLP module 210 for complex descriptions. The NLP module 210 also identifies, for each determined intent, any associated data, for example, a username and password. Techniques such as text parsing, tokenizer, and name finder can be used to identify the mention of custom data within the test scenario as data specific words may be mentioned in any part of a sentence.

The correlation module 220 takes the identified intent and any associated data and correlates the information to objects within the context file. The correlation module 220 first generates a name for the intent based on the NPL processing. The name is based on the context provided in the test scenario, and is referred to as a logical name. The correlation module 220 searches the object map in the context file to determine the best matching object. For example, a test scenario regarding a web application selling various products may have a movie store section. A test scenario, for example, a login to the movie store, may refer to the section of the site as "DVD movie store." The NLP module 210 may determine the intent for the scenario as "enter the DVD movie store," where "DVD movie store" is the logical name assigned to the object. The correlation module 220 takes the assigned logical name and searches the object map from the context file for an object that has an identifier that matches the logical name or is the closest match to the logical name. This match is determined based on the determined intent, NLP of the objects, and any corresponding data in the context file (e.g., identifier and/or associated parameters). The correlation module 220 correlates the intent (e.g., login, enter, click) to the matched object from the context file. For the movie store example, the correlation module 220 may return an object corresponding to a button or link that takes the user to the DVD movie store section of the site, which is then correlated with the intent or action of the scenario (e.g., click on the movie store link).

The script generating module 230 generates an automated testing script based on the determined intent and the associated data from the provided scenario and the correlated object(s) from the provided context file. For example, the determined intent could be at an elementary level (click, enter) or a business process level (login, fill out a form). A login may require a series of steps, such as 1) enter user name, 2) enter password, and 3) click sign on. Another example may be to create a purchase order, which could entail filling out a form with multiple steps.

To generate the file, the script generating module 230 employs the AI model 232. The AI model 232 is trained through a series of machine learning techniques applied to an algorithm using these elementary and business level steps. Machine learning automates model building and allows for the discovery of insights without being explicit programming. Using automated and iterative algorithms, models may be trained to find high-order interactions and patterns within data.

The AI model 232 is trained for a particular application or program, such as the application codebase 120 of FIG. 1, to apply action(s) required to complete various tasks or processes within the application. For example, the AI model 232 is trained to understand what a purchase order means, what login means, and how to perform each within the particular application or program. In some implementations, the provided context file is used to determine the appropriate AI model to employ to build the resulting automated testing script.

The script generating module 230 selects a script template(s) from the template repository 234. The template repository 234 may be a relational database, such as Oracle or DB2, implemented on an enterprise database server, or virtual server. In some implementations, the script templates are a standardized form for automation, which may be employed in keyword driven, data driven and/or hybrid automation frameworks. In some implementations, the script templates are standard or proprietary templates defined by an automation tool, such as Tricentis ToscaTM. The script template is selected based on the automation tool for which the automated testing script is being generated (e.g., UFT, Tricentis Tosca™, Worksoft Certify™, or Selenium™). Based on the AI model, the script generating module 230, determines the action(s) to perform the determined intent to the correlated objects in the respective page of the UI being tested. The script generating module 230 generates the automated script by applying the selected template to the determined actions for the intent and correlated objects, the data read from the provided test scenario, and the step definitions from the test scenario (e.g., the feature file). The data may also be read from a configuration or properties file. This data may be used as the default data unless specific information is provided in the test scenario. In some instances, the actions may not require any additional data. For example, when simply following a link or clicking a button of a particular page within the UI.

In some example, the AI model 232 may not be able to determine the actions to take for a determined intent and correlated object(s). Accordingly, the AI model 232 may use a placeholder in the generated test script for this particular action(s). The AI module 232 may then be retrained to properly determine this action(s). The placeholder may be replaced with the appropriate code and data once the AI model 232 has been retrained. Once generated, the automated testing script is provided to execution engine 160, as described in FIG. 1.

Figure 3:
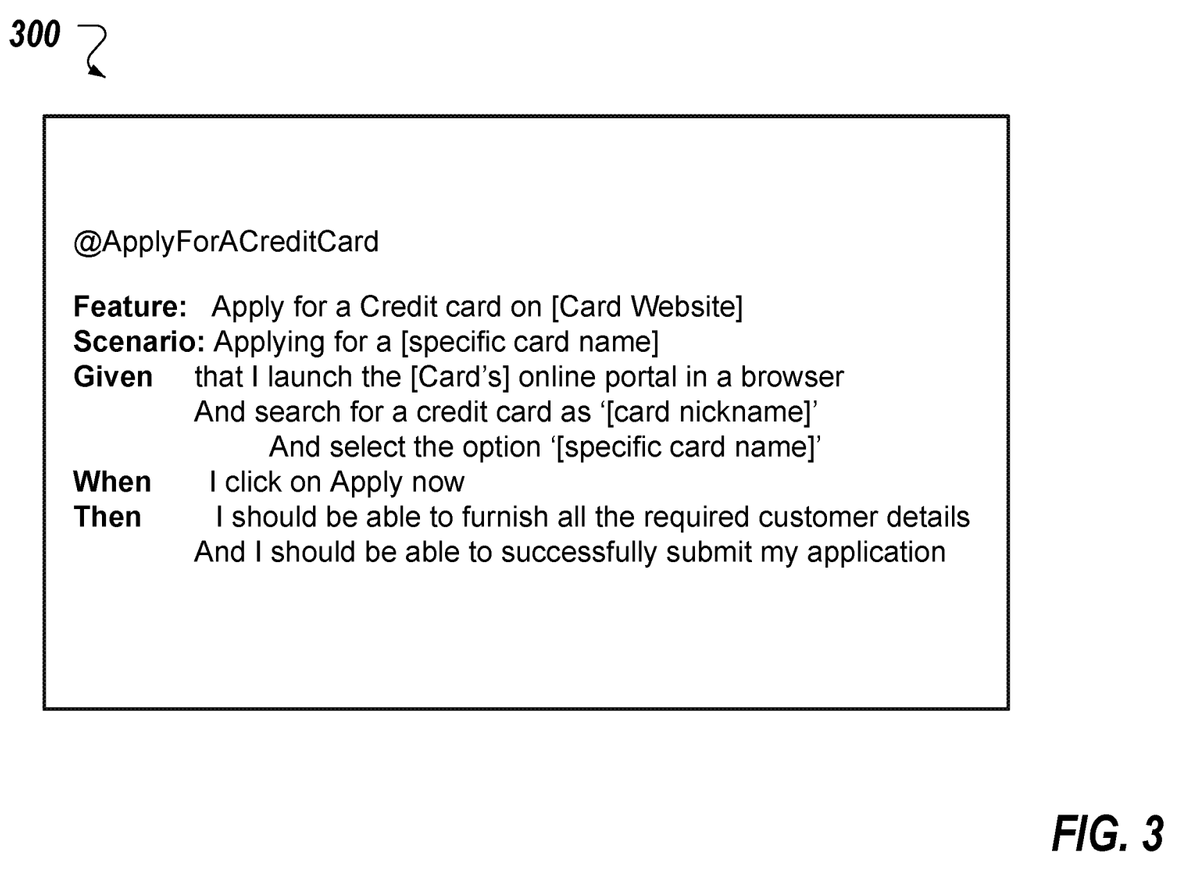
FIG. 3 shows an example test scenario.

FIG. 3 shows an example test scenario. The depicted example is a feature file and the scenario is captured using Gherkin. Like YAML or Python, Gherkin is a line-oriented language that uses indentation to define structure. Line endings terminate statements (called steps) and either spaces or tabs may be used for indentation. Most lines in Gherkin start with a special keyword. The main keywords use in Gherkin are: Feature; Scenario; Given; When, Then, And, But (Steps); Background; Scenario Outline; and Examples. A Gherkin parser divides the input into features, scenarios, and steps. Additionally, Gherkin is available in many languages, such as English and French, which allows captured scenarios to use localized keywords from a selected language. The example depicted in FIG. 3, reflects an example scenario of applying for a credit card on a particular vendor's site.

Figure 4:
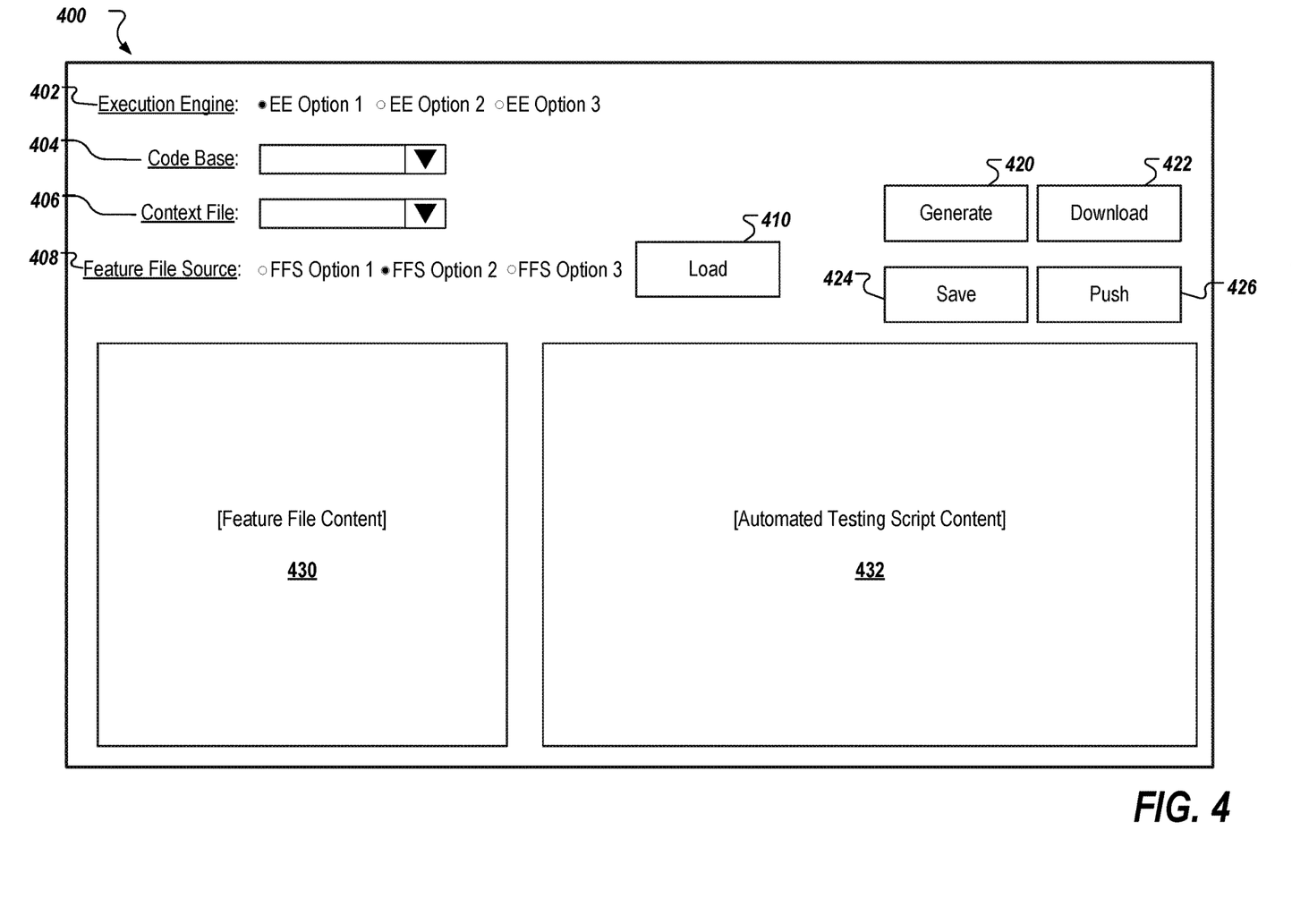
FIG. 4 depicts an automated testing script output screen from an example UI for an automated testing script generation system.

FIG. 4 depicts an automated testing script output screen 400 from an example UI for the automated testing script generation system 100. The output screen 400 includes graphical form elements including an execution engine selection interface 402 (e.g., a bulleted list), an application codebase selection interface 404 (e.g., a drop down), a context file selection interface 406 (e.g., a drop down), a feature file source selection interface 408 (e.g., a bulleted list), a load button 410, a generate button 420, a download button 422, a save button 424, a push button 426, a selected feature file area 430, and a generated script area 432.

The execution engine selection interface 402 provides a list of automation tools, such as UFT, Tricentis Tosca™, Worksoft Certify™, or Selenium™, supported by the automated testing script generation system 100, and enables the user to select a particular automation tool for which to generate the automated testing script. If the user selects the generate button 220, the selected automated tool is used by the automated testing script generation system 100 to determine which template to apply once the intent and object correlation has been determined.

The application codebase selection interface 404 provides a list of codebases from which the user may select. The codebase list is populated with codebases where the respective UI's pages have been parsed and context files generated by the automated testing script generation system 100. The selected codebase is used to populate the context file selection interface 406.

The context file selection interface 406 provides a list of context files. The context file list is populated from the context repository 132 queried based on the selected application codebase. If the user selects the generate button 220, the selected context file is used by the automated testing script generation system 100 to determine the object map to correlated to the intent determined from the provided test scenario (in the selected feature file).

The feature file source selection interface 408 provides a list of source locations from which to search for feature files, and enables a user to select a particular location to search. If the user decides to load a feature file, the user selects (e.g., clicks on) the load button 410. In some implementations, when the user selects the load button 410, a selection window, or listbox (not shown) appears as an overlay that is populated with feature files for the selected codebase and from the selected location. When a user selects the feature file from the selection window, the feature file, which contains a test scenario(s), is loaded and displayed in the selected feature file area 430.

If the user decides to generate an automated script for the selected automated tool using the selected feature file and context file, the user selects the generate button 420. When the user selects the generate button 420, the automated testing script generation system 100 is provided with the selected information (e.g., the automated tool, the feature file, and context file). This information is used by the automated testing script generation system 100 to generate the automated testing script as described above in FIGS. 1 and 2 (see also the description below for FIG. 5). The generated test script is loaded and displayed in selected generated script area 432.

Once an automated testing script has been loaded into the selected generated script area 432 the user may interact with the download button 422, the save button 424, and/or the push button 426. In some implementations, these buttons may be disabled (e.g., greyed out) until the selected generated script area 432 is populated. If the user decides to download the generated test script, the user selects the download button 422. In some implementations, when the user selects the download button 422, a selection window appears as an overlay with locations from the file system of the user device accessing the test script output screen 400. When the user selects a location in the file system, the test script is downloaded to the selected location. If the user decides to save the generated test script, the user selects the save button 424. When the user selects the save button 424, the generated test script is saved to the user's profile used to access the test script output screen 400. Saved test scripts may be accessed on a different screen (not shown). If the user decides to push the generated test script to the execution engine 160, the user selects the push button 426. When the user selects the push button 426, the generated test script is uploaded to the execution engine 160 where it is executed as described above with reference to FIG. 1.

Figure 5:
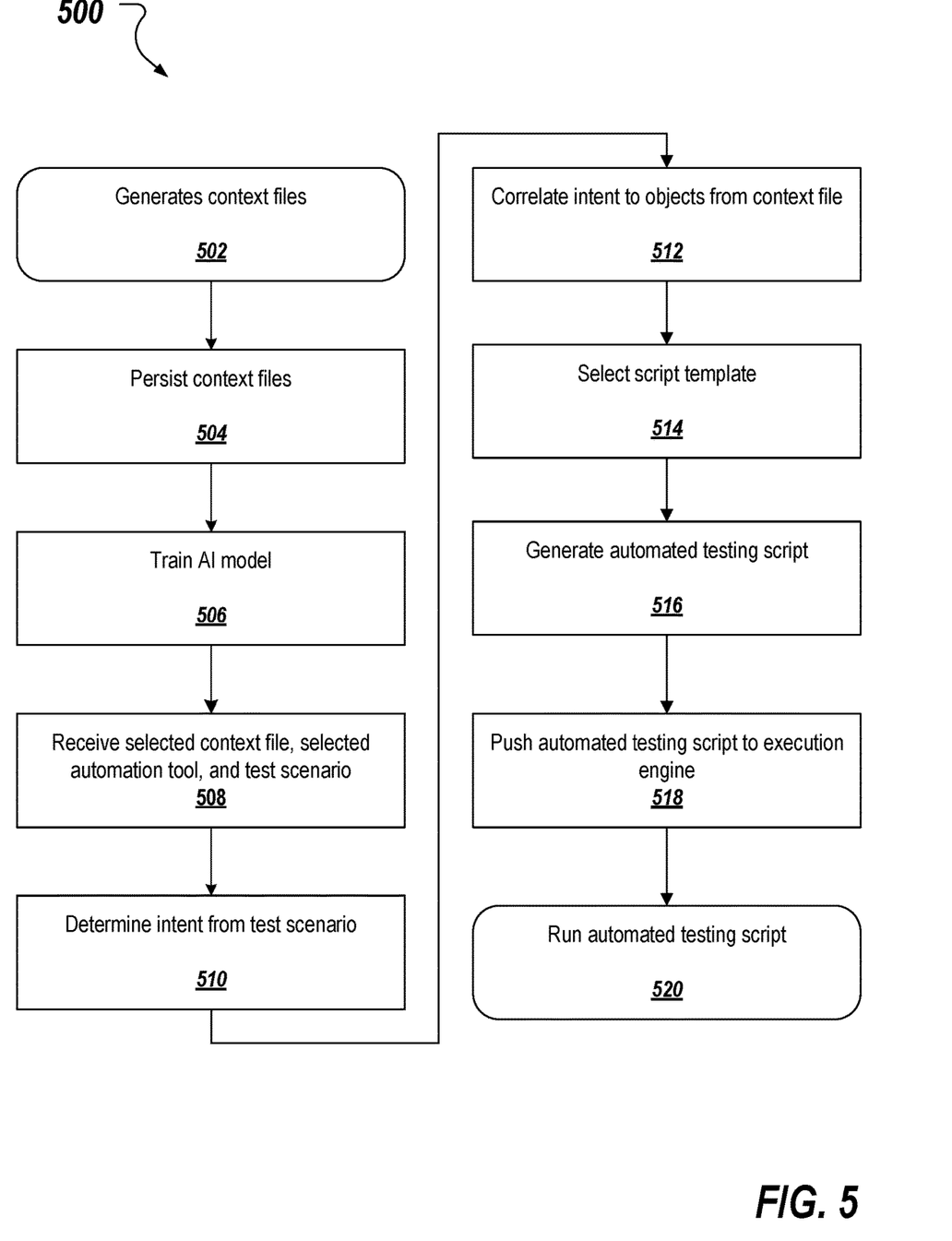
FIG. 5 depicts a flow diagram of an example process employed within a test script generation system to generate an automated testing script.

FIG. 5 depicts a flow diagram of an example process (500) employed within a test script generation system, such as test script generation system 100, to generate an automated testing script. A context generation module parses the pages or screens of an application codebase and generates (502) a context file for each page. The context files are persisted (504) in a context repository. Each context file includes an object map for the objects (e.g., elements) found in the respective page/screen. The test script generation system trains (506) an AI model for the application codebase through a series a machine learning techniques applied to an algorithm correlation module. An AI module receives (508) a selected context file, a selected automation tool, and a test scenario, which may be included within a feature file, from a UI. An NLP module parses the test scenario to determine (510) an intent and associated data for the respective test case. A correlation module correlates (512) the determined intent to an object(s) from the object map in the selected context file. A script generating module selects (514) a script template from a template repository based on the selected the automation tool. The script generating module generates (516) an automated testing script based on the selected template, the determined intent, the associated data, and the correlated object(s). The AI module pushes (518) the generated script to an execution engine. The execution engine runs (520) the generated automated testing script based on current system settings, and the process ends.

Figure 6:
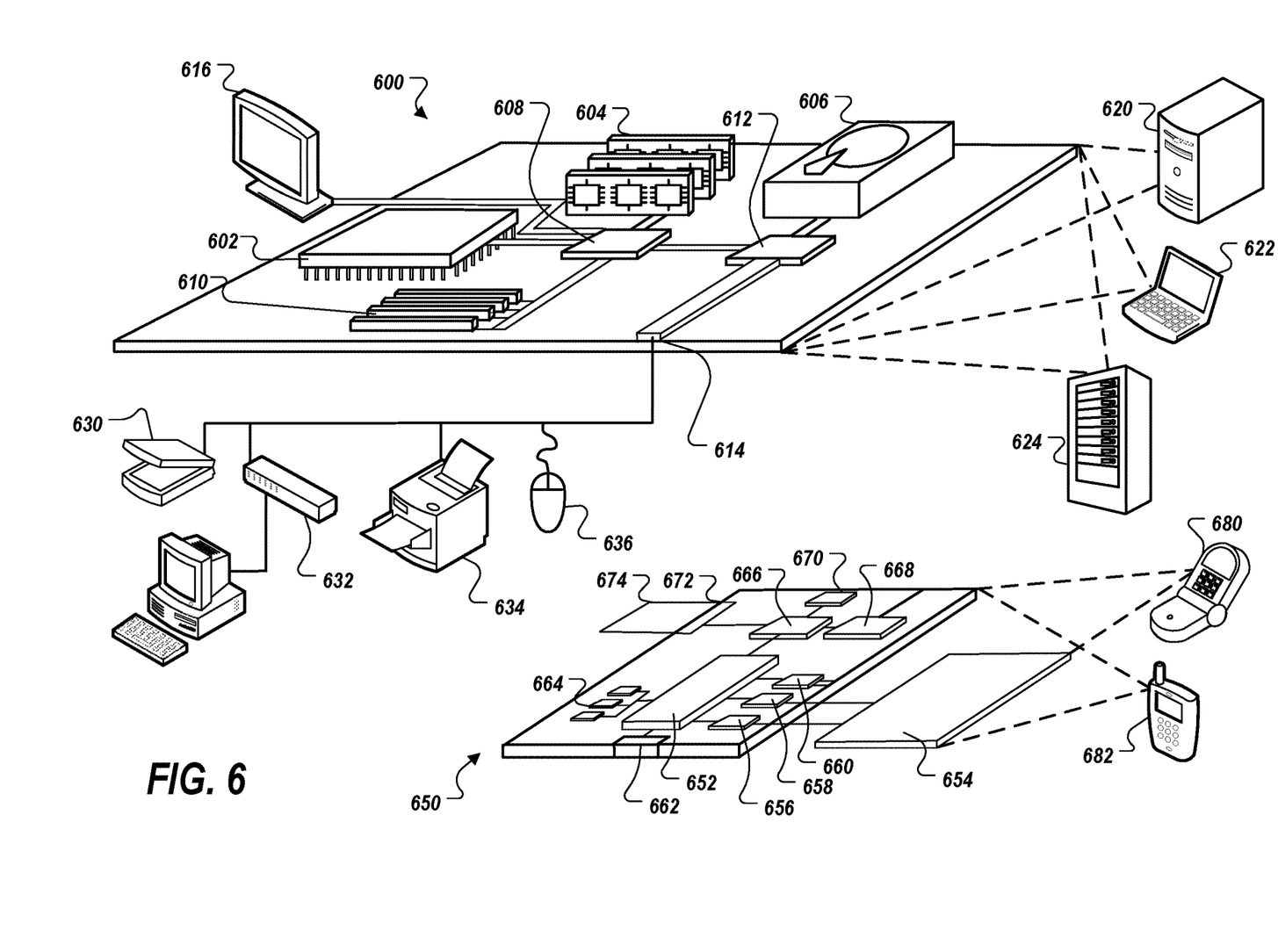
FIG. 6 shows an example of a computing device and a mobile computing device that can be used to implement the techniques described here.

FIG. 6 shows an example of a computing device 600 and a mobile computing device 650 that can be used to implement the techniques described here. The computing device 600 is intended to represent various forms of digital computers, such as laptops, desktops, workstations, personal digital assistants, servers, blade servers, mainframes, and other appropriate computers. The mobile computing device 650 is intended to represent various forms of mobile devices, such as personal digital assistants, cellular telephones, smart-phones, and other similar computing devices. Additionally, computing device 600 or 650 can include Universal Serial Bus (USB) flash drives. The USB flash drives may store operating systems and other applications. The USB flash drives can include input/output components, such as a wireless transmitter or USB connector that may be inserted into a USB port of another computing device. The components shown here, their connections and relationships, and their functions, are meant to be examples only, and are not meant to be limiting.

The computing device 600 includes a processor 602, a memory 604, a storage device 606, a high-speed interface 608 connecting to the memory 604 and multiple high-speed expansion ports 610, and a low-speed interface 612 connecting to a low-speed expansion port 614 and the storage device 606. Each of the processor 602, the memory 604, the storage device 606, the high-speed interface 608, the high-speed expansion ports 610, and the low-speed interface 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as a display 616 coupled to the high-speed interface 608. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 604 stores information within the computing device 600. In some implementations, the memory 604 is a volatile memory unit or units. In some implementations, the memory 604 is a non-volatile memory unit or units. The memory 604 may also be another form of computer-readable medium, such as a magnetic or optical disk.

The storage device 606 is capable of providing mass storage for the computing device 600. In some implementations, the storage device 606 may be or contain a computer-readable medium, such as a floppy disk device, a hard disk device, an optical disk device, or a tape device, a flash memory or other similar solid state memory device, or an array of devices, including devices in a storage area network or other configurations. Instructions can be stored in an information carrier. The instructions, when executed by one or more processing devices (for example, processor 602), perform one or more methods, such as those described above. The instructions can also be stored by one or more storage devices such as computer- or machine-readable mediums (for example, the memory 604, the storage device 606, or memory on the processor 602).

The high-speed interface 608 manages bandwidth-intensive operations for the computing device 600, while the low-speed interface 612 manages lower bandwidth-intensive operations. Such allocation of functions is an example only. In some implementations, the high-speed interface 608 is coupled to the memory 604, the display 616 (e.g., through a graphics processor or accelerator), and to the high-speed expansion ports 610, which may accept various expansion cards. In the implementation, the low-speed interface 612 is coupled to the storage device 606 and the low-speed expansion port 614. The low-speed expansion port 614, which may include various communication ports (e.g., USB, Bluetooth, Ethernet, wireless Ethernet) may be coupled to one or more input/output devices. Such input/output devices may include a scanner 630, a printing device 634, or a keyboard or mouse 636. The input/output devices may also by coupled to the low-speed expansion port 614 through a network adapter. Such network input/output devices may include, for example, a switch or router 632.

The computing device 600 may be implemented in a number of different forms, as shown in the FIG. 6. For example, it may be implemented as a standard server 620, or multiple times in a group of such servers. In addition, it may be implemented in a personal computer such as a laptop computer 622. It may also be implemented as part of a rack server system 624. Alternatively, components from the computing device 600 may be combined with other components in a mobile device, such as a mobile computing device 650. Each of such devices may contain one or more of the computing device 600 and the mobile computing device 650, and an entire system may be made up of multiple computing devices communicating with each other.

The mobile computing device 650 includes a processor 652, a memory 664, an input/output device such as a display 654, a communication interface 666, and a transceiver 668, among other components. The mobile computing device 650 may also be provided with a storage device, such as a micro-drive or other device, to provide additional storage. Each of the processor 652, the memory 664, the display 654, the communication interface 666, and the transceiver 668, are interconnected using various buses, and several of the components may be mounted on a common motherboard or in other manners as appropriate.

The processor 652 can execute instructions within the mobile computing device 650, including instructions stored in the memory 664. The processor 652 may be implemented as a chip set of chips that include separate and multiple analog and digital processors. For example, the processor 652 may be a Complex Instruction Set Computers (CISC) processor, a Reduced Instruction Set Computer (RISC) processor, or a Minimal Instruction Set Computer (MISC) processor. The processor 652 may provide, for example, for coordination of the other components of the mobile computing device 650, such as control of user interfaces, applications run by the mobile computing device 650, and wireless communication by the mobile computing device 650.

The processor 652 may communicate with a user through a control interface 658 and a display interface 656 coupled to the display 654. The display 654 may be, for example, a Thin-Film-Transistor Liquid Crystal Display (TFT) display or an Organic Light Emitting Diode (OLED) display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may provide communication with the processor 652, so as to enable near area communication of the mobile computing device 650 with other devices. The external interface 662 may provide, for example, for wired communication in some implementations, or for wireless communication in other implementations, and multiple interfaces may also be used.

The memory 664 stores information within the mobile computing device 650. The memory 664 can be implemented as one or more of a computer-readable medium or media, a volatile memory unit or units, or a non-volatile memory unit or units. An expansion memory 674 may also be provided and connected to the mobile computing device 650 through an expansion interface 672, which may include, for example, a Single in Line Memory Module (SIMM) card interface. The expansion memory 674 may provide extra storage space for the mobile computing device 650, or may also store applications or other information for the mobile computing device 650. Specifically, the expansion memory 674 may include instructions to carry out or supplement the processes described above, and may include secure information also. Thus, for example, the expansion memory 674 may be provided as a security module for the mobile computing device 650, and may be programmed with instructions that permit secure use of the mobile computing device 650. In addition, secure applications may be provided via the SIMM cards, along with additional information, such as placing identifying information on the SIMM card in a non-hackable manner.

The memory may include, for example, flash memory and/or non-volatile random access memory (NVRAM), as discussed below. In some implementations, instructions are stored in an information carrier. that the instructions, when executed by one or more processing devices (for example, processor 652), perform one or more methods, such as those described above. The instructions can also be stored by one or more storage devices, such as one or more computer- or machine-readable mediums (for example, the memory 664, the expansion memory 674, or memory on the processor 652). In some implementations, the instructions can be received in a propagated signal, for example, over the transceiver 668 or the external interface 662.

The mobile computing device 650 may communicate wirelessly through the communication interface 666, which may include digital signal processing circuitry where necessary. The communication interface 666 may provide for communications under various modes or protocols, such as Global System for Mobile communications (GSM) voice calls, Short Message Service (SMS), Enhanced Messaging Service (EMS), or Multimedia Messaging Service (MMS) messaging, code division multiple access (CDMA), time division multiple access (TDMA), Personal Digital Cellular (PDC), Wideband Code Division Multiple Access (WCDMA), CDMA2000, or General Packet Radio Service (GPRS), among others. Such communication may occur, for example, through the transceiver 668 using a radio-frequency. In addition, short-range communication may occur, such as using a Bluetooth, Wi-Fi, or other such transceiver. In addition, a Global Positioning System (GPS) receiver module 670 may provide additional navigation- and location-related wireless data to the mobile computing device 650, which may be used as appropriate by applications running on the mobile computing device 650.

The mobile computing device 650 may also communicate audibly using an audio codec 660, which may receive spoken information from a user and convert it to usable digital information. The audio codec 660 may likewise generate audible sound for a user, such as through a speaker, e.g., in a handset of the mobile computing device 650. Such sound may include sound from voice telephone calls, may include recorded sound (e.g., voice messages, music files, etc.) and may also include sound generated by applications operating on the mobile computing device 650.

The mobile computing device 650 may be implemented in a number of different forms, as shown in the figure. For example, it may be implemented as a cellular telephone 680. It may also be implemented as part of a smart-phone, personal digital assistant, or other similar mobile device.

Various implementations of the systems and techniques described here can be realized in digital electronic circuitry, integrated circuitry, specially designed application specific integrated circuits (ASICs), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a cathode ray tube (CRT) or liquid crystal display (LCD) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. For example, while a client application is described as accessing the delegate(s), in other implementations the delegate(s) may be employed by other applications implemented by one or more processors, such as an application executing on one or more servers. In addition, the logic flows depicted in the figures do not require the particular order shown, or sequential order, to achieve desirable results. In addition, other actions may be provided, or actions may be eliminated, from the described flows, and other components may be added to, or removed from, the described systems. Accordingly, other implementations are within the scope of the following claims.

What is claimed is:

1. A computer-implemented method executed by one or more processors, the method comprising:
receiving a context file, a test scenario, and a selected automation tool selected through a user interface, the context file including an object map comprising objects that correlate to respective components of a display page for an application, the test scenario describing a test case for the application involving an intended interaction with at least one of the components on the display page;

correlating the intended interaction with the at least one component with the corresponding object in the object map;

processing the intended interaction and the corresponding object through an Artificial Intelligence (AI) model, the AI model trained using training data comprising a plurality of processes and respective process steps supported by the components of the display page;

determining a script template based on the processing and the selected automation tool;

applying, based on the processing, the script template to the intended interaction and the correlated object to generate an automated testing script for the selected automating tool, the automated testing script including placeholder data, wherein the AI model is retrained to replace the placeholder data with the appropriate scripting code, and wherein the placeholder data is replaced with the appropriate scripting code by processing the automated testing script through the AI model; and executing the automated testing script to test one or more functions of the display page supporting the test scenario.

2. The method of claim 1, wherein the test scenario includes scenario data used for the intended interaction, and wherein the automated testing script is generated by applying the script template to the scenario data.

3. The method of claim 1, further comprising:
parsing the test scenario through natural language processing techniques to determine the intended interaction.

4. The method of claim 1, wherein the test scenario is included in a feature file written in Gherkin.

5. The method of claim 1, wherein the context file is generated by:
parsing the display page to identify the components, and logically mapping the components to the respective objects.

6. The method of claim 1, wherein the automated testing script is generated with default values for the intended interaction.

7. The method of claim 1, wherein the selected automation tool is one of Unified Functional Testing (UFT), Tricentis Tosca™, Worksoft Certify™, or Selenium™.

8. The method of claim 1, wherein the AI model is trained through machine learning techniques by applying data regarding the processes to an algorithm.

9. One or more non-transitory computer-readable storage media coupled to one or more processors and having instructions stored thereon which, when executed by the one or more processors, cause the one or more processors to perform operations comprising:

receiving a context file, a test scenario, and a selected automation tool selected through a user interface, the context file including an object map comprising objects that correlate to respective components of a display page for an application, the test scenario describing a test case for the application involving an intended interaction with at least one of the components on the display page;

correlating the intended interaction with the at least one component with the corresponding object in the object map;

processing the intended interaction and the corresponding object through an Artificial Intelligence (AI) model, the AI model trained using training data comprising a plurality of processes and respective process steps supported by the components of the display page;

determining a script template based on the processing and the selected automation tool;

applying, based on the processing, the script template to the intended interaction and the correlated object to generate an automated testing script for the selected automating tool, the automated testing script including placeholder data, wherein the AI model is retrained to replace the placeholder data with the appropriate scripting code, and wherein the placeholder data is replaced with the appropriate scripting code by processing the automated testing script through the AI model; and executing the automated testing script to test one or more functions of the display page supporting the test scenario.

10. The one or more non-transitory computer-readable storage media of claim 9, wherein the test scenario includes scenario data used for the intended interaction, and wherein the automated testing script is generated by applying the script template to the scenario data.

11. The one or more non-transitory computer-readable storage media of claim 9, wherein the operations further comprise:
parsing the test scenario through natural language processing techniques to determine the intended interaction.

12. The one or more non-transitory computer-readable storage media of claim 9, wherein the test scenario is included in a feature file written in Gherkin.

13. The one or more non-transitory computer-readable storage media of claim 9, wherein the context file is generated by:
parsing the display page to identify the components, and logically mapping the components to the respective objects.

14. A system, comprising:
one or more processors; and
a computer-readable storage device coupled to the one or more processors and having instructions stored thereon which, when executed by the one or more processors, cause the one or more processors to perform operations comprising:

receiving a context file, a test scenario, and a selected automation tool selected through a user interface, the context file including an object map comprising objects that correlate to respective components of a display page for an application, the test scenario describing a test case for the application involving an intended interaction with at least one of the components on the display page;

correlating the intended interaction with the at least one component with the corresponding object in the object map;

processing the intended interaction and the corresponding object through an Artificial Intelligence (AI) model, the AI model trained using training data comprising a plurality of processes and respective process steps supported by the components of the display page;

determining a script template based on the processing and the selected automation tool;

applying, based on the processing, the script template to the intended interaction and the correlated object to generate an automated testing script for the selected automating tool, the automated testing script including placeholder data, wherein the AI model is retrained to replace the placeholder data with the appropriate scripting code, and wherein the placeholder data is replaced with the appropriate scripting code by processing the automated testing script through the AI model; and executing the automated testing script to test one or more functions of the display page supporting the test scenario.

15. The system of claim 14, wherein the automated testing script is generated with default values for the intended interaction.

16. The system of claim 14, wherein the selected automation tool is one of Unified Functional Testing (UFT), Tricentis Tosca™, Worksoft Certify™, or Selenium™.

17. The system of claim 14, wherein the AI model is trained through machine learning techniques by applying data regarding the processes to an algorithm.

18. The system of claim 14, wherein the test scenario includes scenario data used for the intended interaction, and wherein the automated testing script is generated by applying the script template to the scenario data.

* * * * *